United States Patent [19]
Billings et al.

[11] Patent Number: 5,277,518
[45] Date of Patent: * Jan. 11, 1994

[54] CONTAMINANT REMEDIATION, BIODEGRADATION AND REMOVEL METHODS AND APPARATUS

[75] Inventors: Jeffery F. Billings; Gale K. Billings, both of Albuquerque, N. Mex.

[73] Assignee: Environmental Improvement Technologies, Inc., Albuquerque, N. Mex.

[*] Notice: The portion of the term of this patent subsequent to Jun. 22, 2010 has been disclaimed.

[21] Appl. No.: 800,545

[22] Filed: Nov. 27, 1991

Related U.S. Application Data

[63] Continuation-in-part of Ser. No. 712,919, Jun. 7, 1991, Pat. No. 5,221,159, which is a continuation-in-part of Ser. No. 500,767, Mar. 28, 1990, abandoned.

[51] Int. Cl.$^5$ .................. E21B 36/00; E21B 43/00; E21B 43/40
[52] U.S. Cl. .................. 405/128; 166/246; 435/266
[58] Field of Search .............. 405/128-131; 435/248, 249, 266, 313; 210/610; 166/227, 246

[56] References Cited

U.S. PATENT DOCUMENTS

| | | |
|---|---|---|
| Re. 33,102 | 10/1989 | Visser et al. ............... 166/267 |
| 632,388 | 9/1899 | Whitehead ................ 405/131 |
| 2,523,091 | 9/1950 | Bruce ..................... 166/265 X |
| 2,969,226 | 1/1961 | Huntington . |
| 3,216,905 | 11/1965 | Baptist . |
| 3,351,132 | 11/1967 | Dougan et al. . |
| 3,665,716 | 5/1972 | Rogers et al. ............... 405/128 |
| 3,678,999 | 7/1972 | Kulikov et al. ............ 166/227 X |
| 3,743,582 | 7/1973 | Kitai et al. ................ 435/313 X |
| 3,828,525 | 8/1974 | Copa et al. .................. 55/68 |
| 3,846,290 | 11/1974 | Raymond ..................... 210/610 |
| 4,026,355 | 5/1977 | Johnson et al. ........... 405/129 X |
| 4,126,556 | 11/1978 | Swanson et al. . |
| 4,183,407 | 1/1980 | Knopik ..................... 166/314 |
| 4,241,787 | 12/1980 | Price ....................... 166/105 |
| 4,249,605 | 2/1981 | Slater et al. ................ 166/266 |
| 4,289,204 | 9/1981 | Stewart .................... 166/303 |
| 4,296,810 | 10/1981 | Price ....................... 166/265 |
| 4,303,127 | 12/1981 | Freel et al. .................. 166/266 |
| 4,323,122 | 4/1982 | Knopik ..................... 166/267 |
| 4,358,221 | 11/1982 | Wickberg ................. 405/128 X |
| 4,401,569 | 8/1983 | Jhaveri et al. ................ 210/610 |
| 4,435,292 | 3/1984 | Kirk et al. .................. 210/747 |
| 4,442,901 | 4/1984 | Zison ....................... 166/369 |
| 4,469,176 | 9/1984 | Zison et al. ................. 166/250 |
| 4,518,399 | 5/1985 | Croskell et al. ............... 55/16 |
| 4,544,381 | 10/1985 | Schmidt .................... 435/266 X |

(List continued on next page.)

FOREIGN PATENT DOCUMENTS 3427532 8/1985 Fed. Rep. of Germany ...... 405/131

OTHER PUBLICATIONS

Dickinson, Wade, et al., "Radial Wells and Hazardous Waste Sites," *RCRA Site Remediation*, pp. 232-237 (no date).

(List continued on next page.)

*Primary Examiner*—Dennis L. Taylor
*Assistant Examiner*—John Ricci
*Attorney, Agent, or Firm*—Deborah A. Peacock; Rod D. Baker; Jeffrey D. Myers

[57] ABSTRACT

Methods and apparatuses for removing contaminants. A plurality of injection wells are drilled through the vadose zone to a depth below the water table defining the upper boundary of the aquifer. A plurality of venting wells or venting laterals are established to a depth above the water table sufficient to discourage fouling by contaminated water or condensate, and oxygenated gas is injected under pressure through the injection wells. Additional biochemical cleansing may occur at ground level prior to venting of contaminated air. Microbes natural to the contaminated site may be extracted, analyzed, fermented, and reintroduced to enhance biodegradation, and nutrients, food, or both, may be supplied to the microbial population to sustain high levels of degradation activity. Relatively pure liquid contaminant may be separated from other fluids, such as water.

114 Claims, 4 Drawing Sheets

U.S. PATENT DOCUMENTS

| | | | |
|---|---|---|---|
| 4,588,506 | 5/1986 | Raymond et al. | 210/606 |
| 4,593,760 | 6/1986 | Visser et al. | 166/267 |
| 4,660,639 | 4/1987 | Visser et al. | 166/267 |
| 4,662,900 | 5/1987 | Ottengraf | 55/90 |
| 4,713,343 | 12/1987 | Wilson, Jr. et al. | 435/264 |
| 4,723,968 | 2/1988 | Schippert et al. | 435/266 X |
| 4,730,672 | 3/1988 | Payne | 166/266 |
| 4,745,850 | 5/1988 | Bastian et al. | |
| 4,765,902 | 8/1988 | Ely et al. | 210/610 |
| 4,806,148 | 2/1989 | Ottengraf | 55/223 |
| 4,832,122 | 5/1989 | Corey et al. | 166/266 |
| 4,842,448 | 6/1989 | Koerner et al. | 405/258 |
| 4,850,745 | 7/1989 | Hater et al. | 405/258 |
| 4,872,994 | 10/1989 | Jakob | 210/691 |
| 4,890,673 | 1/1990 | Payne | 166/266 |
| 4,927,292 | 5/1990 | Justice | 405/129 X |
| 4,982,788 | 1/1991 | Donnelly | 405/131 X |
| 5,067,852 | 11/1991 | Plunkett | 405/128 |
| 5,076,727 | 12/1991 | Johnson et al. | 405/128 |
| 5,080,793 | 1/1992 | Urlings | 435/266 X |
| 5,116,163 | 5/1992 | Bernhardt | 405/128 |

OTHER PUBLICATIONS

"SVVS Remediation Technology," Billings & Assoc. (1990).

"Developments in Remediation," Billings & Assoc. (1990).

Rogoshewski, P., et al., "Remedial Action Technology for Waste Disposal Sites," Noyes Data Corporation, pp. 259–269 (1983).

Perodical, "Air sparging Improves Effectiveness of Soil Vapor Extraction Systems", The Hazardous Waste Consultant, vol. 9, Issue 2, pp. 1.1–1.4 (Mar./Apr. 1991).

Marley, Michael C., "Air Sparging in Conjunction with Vapor Extraction for Source Removal at Voc Spill Sites", 5th National Outdoor Action Conference, Nat'l Water Well Assn, pp. 89–101 (1991).

Yaniga, et al., "Restoration of Water Quality in a Multiaquifer System Via Insitu Biodegradation of the Organic Contaminants", 5th Nt'l Symp, Nat'l Water Well Assn, pp. 510–526 (1985).

Coia, et al., "Soil Decontamination Through in Situ Air Stripping of Volatile Organics-A Pilot Demo.", Proceedings of the Nat'l Water Well Assn/Amer. Petroleum Inst. Conf., pp. 555–564 (1985).

Regalbuto, et al., "In-Situ Removal of VOC's by Means of Enhanced Volatilization", Proc. Petrol. Hydrocarbons and Organic Chem in Ground Water, Assn of Ground Water Sci., pp. 571–590 (1988).

Gudemann, et al., "In Situ Remediation of VOC Contaminated Soil and Groundwater by Vapor Extraction and Groundwater Aeration", Haztech International '88, Conference Proceedings, pp. 2A–90 through 2A–111 (1988).

FIG-6

CONTAMINANT REMEDIATION, BIODEGRADATION AND REMOVEL METHODS AND APPARATUS

CROSS-REFERENCE TO RELATED APPLICATIONS

This application is a continuation-in-part application of U.S. patent application Ser. No. 07/712,919, entitled *Subsurface Remediation, Biodegradation and Extraction Methods and Apparatuses*, to Jeffery F. Billings and Gale K. Billings, filed on Jun. 7, 1991 now U.S. Pat. No. 5,221,159, which is a continuation-in-part application of U.S. patent application Ser. No. 07/500,767, entitled Subsurface Volatilization Method and System, to Jeffery F. Billings, filed on Mar. 28, 1990, now abandoned, the teachings of both of which are incorporated herein by reference.

BACKGROUND OF THE INVENTION

Field of the Invention (Technical Field)

The present invention relates generally to methods and apparatuses for in situ remediation of organic contaminants, such as hydrocarbons, and inorganic contaminants, such as metals, from subsurface soil and ground water. In situ remediation of excavated materials and surface spills of liquid contaminants also may be conducted utilizing the present invention.

Background Art

The background of the present inventions is discussed in depth in U.S. patent application Ser. No. 07/712,919, entitled *Subsurface Remediation, Biodegradation and Extraction Methods and Apparatuses*, to Jeffery F. Billings and Gale K. Billings, filed on Jun. 7, 1991, and in U.S. patent application Ser. No. 07/500,767, entitled *Subsurface Volatilization Method and System*, to Jeffery F. Billings, filed on Mar. 28, 1990, now abandoned, the teachings of both of which are incorporated herein by reference.

The vacuum extraction inventions disclosed in the above two applications (and all known vacuum extraction systems) have, due to the use of extraction wells having perforations near the bottom thereof, encountered problems with the upwelling or condensation of contaminated subsurface water into the extraction wells, and concomitant fouling of the extraction wells and pumps, thus necessitating expensive surface water treatment equipment. The present invention solves this problem in a number of ways, while enhancing remediation.

Additionally, as disclosed herein, the liquid contaminant extraction apparatus and method of U.S. patent application Ser. No. 07/712,919 may be employed to remove contaminants from surface waters, such as lakes, rivers, seas, and oceans.

Furthermore, as disclosed herein, the volatilization inventions employing injection wells disclosed in U.S. patent application Ser. Nos. 07/712,919 and 07/500,767 may be used with or without extraction wells.

SUMMARY OF THE INVENTION (DISCLOSURE OF THE INVENTION)

The present invention comprises in situ methods and apparatuses for removal of contaminants from soil or from ground water, or both.

The first method and apparatus comprises establishing in situ at least one venting well having gas-permeable openings at an upper portion thereof, whereby volatile contaminants in the ground water or soil are removed through the venting well. In the preferred embodiment, at least one injection well is established in situ and oxygen-containing gas is injected into the injection well. Optionally, a vacuum is applied to the venting well. Preferably, the venting well and the injection well are within two hundred feet of one another and make up a well nest. The injection well, depending on site stratigraphy, is preferably within ten feet of the venting well and may be adjacent the venting well within a same bore hole. Preferably, the oxygen-containing gas is heated by solar heating, the venting well comprises a condensate drain at a lower end thereof, and microorganisms and nutrients, food, or both, are provided to a subsurface contaminated zone. The invention may additionally comprise sampling soil or water, isolating at least one microorganism useful in biodegrading the contaminants, fermenting the isolated microorganisms to increase their population, and inserting the fermented microorganisms into the subsurface. The invention may also comprise providing an elongated tube reservoir capped at one end (preferably to the bore hole of a venting well, an injection well, or both), providing entry ports in the elongated tube reservoir, surrounding the entry ports with filtration means, and collecting contaminants in the elongated tube reservoir by passage thereof through the filtration means. The invention may further comprise impregnating water with microorganisms useful in biodegradation of the contaminant, confining the impregnated water to one or more containers, and bubbling contaminants from the venting well through the impregnated water within the containers. Preferably, the venting well additionally comprises gas-permeable but low capillary-lift fill material below the gas-permeable openings in the venting well.

The second method and apparatus of the invention comprises: establishing in situ a venting lateral comprising gas-permeable openings therein; establishing in situ a plurality of injection wells; and injecting oxygen-containing gas into the injection wells; whereby volatile contaminants in the ground water or soil are removed through the venting lateral. Optionally, a vacuum is applied to the venting lateral. Preferably, the venting lateral and the injection well are within two hundred feet of one another and make up a well nest, the oxygen-containing gas is heated by solar heating, and microorganisms and nutrients, food, or both, are provided to the subsurface. The invention may additionally comprise sampling soil or water, isolating at least one microorganism useful in biodegrading the contaminants, fermenting the isolated microorganisms to increase their population, and inserting the fermented microorganisms into the subsurface. The invention may also comprise providing an elongated tube reservoir capped at one end (preferably to an injection well), providing entry ports in the elongated tube reservoir, surrounding the entry ports with filtration means, and collecting contaminants in the elongated tube reservoir by passage thereof through the filtration means. The invention may further comprise impregnating water with microorganisms useful in biodegradation of the contaminant, confining the impregnated water to one or more containers, and bubbling contaminants from the venting well through the impregnated water within the containers. Preferably, the venting well additionally comprises one or more vertical vents beneath the gas-permeable openings of the venting lateral. The vertical vent may be a gas-permeable chimney of sand or a venting well having gas-permeable openings therein and, optionally, being fluidly connected to the venting lateral, or a combination of the two types (a venting well extending partially down a sand chimney).

The third method and apparatus of the invention comprises: establishing in situ a venting lateral comprising gas-permeable openings therein; and placing a vertical vent beneath the venting lateral; whereby volatile contaminants in the ground water or soil are removed through the venting lateral. In the preferred embodiment, at least one injection well is established in situ and oxygen-containing gas is injected into the injection well. Optionally, a vacuum is applied to the venting lateral. Preferably, the venting lateral and the injection well are within two hundred feet of one another and make up a well nest, the oxygen-containing gas is heated by solar heating, and microorganisms and nutrients, food, or both, are provided to the subsurface. The invention may additionally comprise sampling soil or water, isolating at least one microorganism useful in biodegrading the contaminants, fermenting the isolated microorganisms to increase their population, and inserting the fermented microorganisms into the subsurface. The invention may also comprise providing an elongated tube reservoir capped at one end (preferably to an injection well), providing entry ports in the elongated tube reservoir, surrounding the entry ports with filtration means, and collecting contaminants in the elongated tube reservoir by passage thereof through the filtration means. The invention may further comprise impregnating water with microorganisms useful in biodegradation of the contaminant, confining the impregnated water to one or more containers, and bubbling contaminants from the venting well through the impregnated water within the containers. Preferably, the vertical vent is beneath the gas-permeable opening of the venting lateral. The vertical vent may be a gas-permeable chimney of sand or a venting well having gas-permeable openings therein and, optionally, being fluidly connected to the venting lateral, or a combination of the two types (a venting well extending partially down a sand chimney).

The fourth method and apparatus of the invention comprises: establishing in situ at least one injection well into the ground water; injecting oxygen-containing gas into the injection well to volatilize and biodegrade contaminants in the ground water and soil; and permitting upward migration of the volatilized and biodegraded contaminants without one or more venting conduits. In other words, no venting wells, venting laterals, or equivalent equipment is used. Preferably, the oxygen-containing gas is heated by solar heating and microorganisms and nutrients, food, or both, are provided to the subsurface. The invention may additionally comprise sampling water or soil, isolating at least one microorganism useful in biodegrading the contaminants, fermenting the isolated microorganisms to increase their population, and inserting the fermented microorganisms into the subsurface. The invention may also comprise providing an elongated tube reservoir capped at one end (preferably to an injection well), providing entry ports in the elongated tube reservoir, surrounding the entry ports with filtration means, and collecting contaminants in the elongated tube reservoir by passage thereof through the filtration means.

Accordingly, a primary object and purpose of the present invention is to provide an improved method and associated system for removing contaminants which does not suffer from the deleterious effects of upwelling and condensation of contaminated liquid water.

Another object of the present invention is to remove contaminants from a subsurface aquifer and from surface water, the contaminants being removed in relatively pure form.

An additional object of the present invention is to provide a method and system of removal of contaminants from subsurface soil as well as from ground water.

Another object and purpose of the present invention is to provide a relatively inexpensive method and system for in situ removal of contaminants from subsurface ground water and soil, as well as from surface waters.

A primary advantage of the present invention is that it is relatively inexpensive, efficient, and quick because of the combination of technologies employed.

An additional advantage of the present invention is that it integrates simultaneous remediation of free-product, soil residual, vapors, and contaminated ground water. If the invention is operated in the subsurface, these processes take place in: (a) the vadose zone; (b) the capillary fringe zone between the vadose zone and the water table; (c) at the water table; and (d) below the water table, synchronously. It does so by synchronous attack upon each of the physical and chemical characteristics of the four types of contamination. The invention is also operable above ground, for example, on excavated materials.

Yet another advantage of the present invention is that contaminated air may either be vented or treated before venting.

An additional advantage of the present invention is that liquid hydrocarbon contaminant may be removed from contaminated water such that the hydrocarbon contaminant is pure enough to be refined rather than handled as a toxic waste.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENTS (BEST MODES FOR CARRYING OUT THE INVENTION)

The present invention relates to methods and apparatuses for remediating, biodegrading, and extracting organic and inorganic contaminants.

The air-injection methods and apparatuses of the present invention are preferably employed to remove contaminants from subsurface soil and ground water by physical, chemical, and biological means, in situ. However, the same methods and apparatuses may be employed in man-made landfills, with excavated soils, to directly treat industrial wastes, and the like. The air-injection/air-venting systems of the invention may be combined with biotreatment of contaminated gases prior to venting, extraction of contaminants from water, injection of contaminant-consuming microbes into the contaminants, and growth stimulation of natural or injected microbes by subsurface injection of nutrients (predominantly inorganic compounds), food (predominantly organic compounds), or both.

The liquid contaminant extraction method and apparatus of the invention is preferably used to remove free liquid contaminants from subsurface water. However, the invention may also be used to remove liquid contaminants from surface waters. For example, the invention may be used to assist in remediation of hydrocarbon spills (e.g., from an oil tanker spill) so as to recover contaminants which are thereafter relatively pure and therefore commercially useful.

Figure 1:
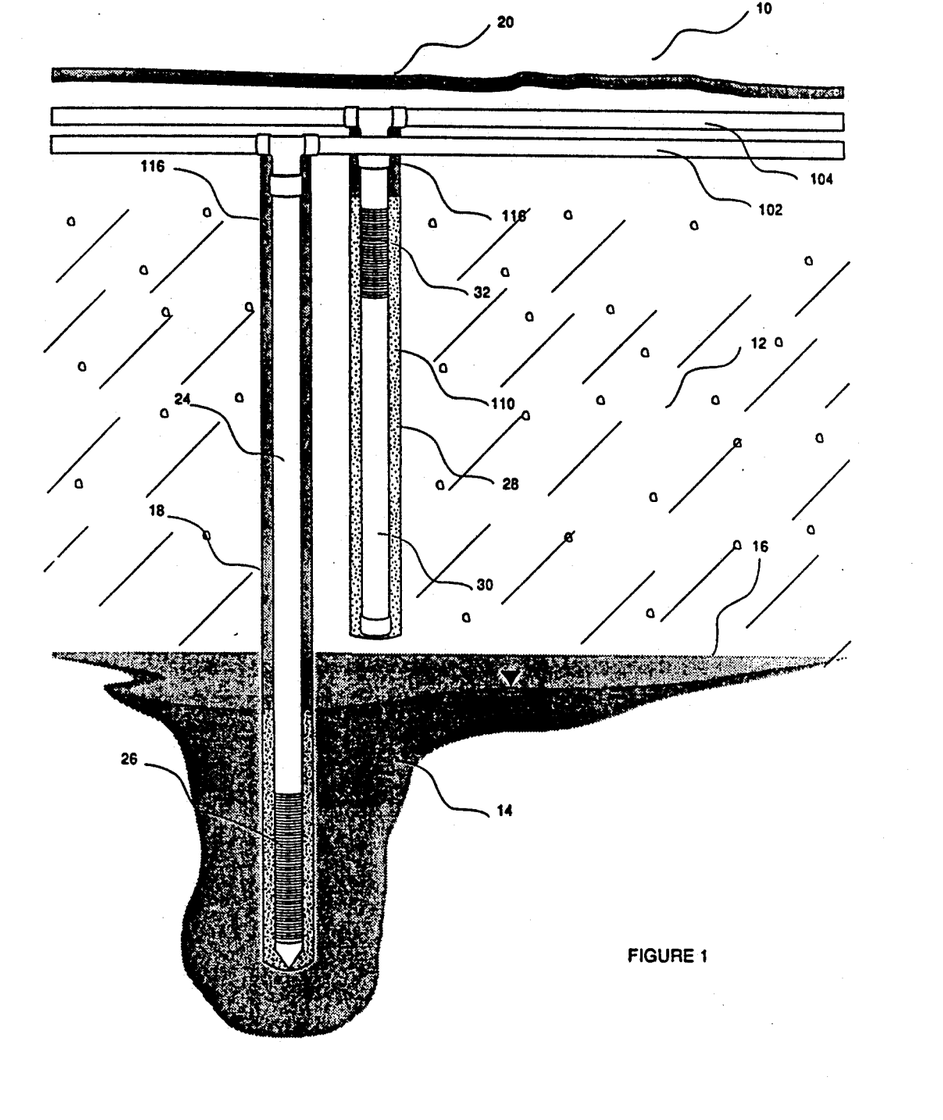
FIG. 1 is a schematic illustration in cross-section of a subterranean soil formation having a water table, wherein the preferred method and system of the present invention are being applied.

Referring to FIG. 1, the preferred embodiment of the present air-injection invention is illustrated therein as directed to the remediation of a contaminated site 10, wherein there is a vadose zone 12 overlying a ground water reservoir or aquifer 14. The contamination will be present in the ground water reservoir or aquifer 14 and in the vadose zone 12. The upper boundary of the aquifer 14 is defined by the level of the water table 16. It will be recognized that there may be a capillary zone (not shown separately) above the water table 16, in which water is drawn upwardly into the vadose zone 12 by capillary action, and the term "vadose zone" is intended to cover this capillary zone. In general, the capillary zone will be contaminated if the ground water itself is contaminated.

In the preferred embodiment, a plurality of injection wells 18 extend from the ground surface 20 to a level beneath the water table 16 into the aquifer 14. The injection wells 18 are connected to an air compressor (not shown) via manifold 102. The air compressor preferably has a capacity of at least approximately 10 to 300 cubic feet per minute (cfm) at 1 to 100 pounds per square inch (psi). Air or other oxygen-containing gas is introduced into the injection well 18 via the air compressor. The term "air," as used throughout the specification, is intended to include oxygen-containing gases.

The injection wells 18 are preferably made of common materials such as polyvinyl chloride (PVC). Injection wells are completed and emplaced using common well methodology. The injection wells 18 preferably include a gas-impermeable well liner 24, such as a PVC pipe, along the major part of its length. The injection well 18 extends to a depth of preferably one to 100 feet beneath the water table 16. The depth of penetration below the water table 16 depends on the thickness or extent of the contaminated portion of the ground water aquifer 14. Air, or other oxygen-containing gas, is introduced into the injection well 16 and exits the injection well 16 through a screen 26 or other perforated material, of a common manufactured type, into the aquifer 14 at the chosen depth.

The end of the injection well 18 in the aquifer 14 contains openings, such as from a gravel-packed, 10–40 slot screen 26 or piping with holes or perforations. The screen 26 functions as a sparger to introduce pressurized air into the aquifer 14, so as to stimulate circulation of the water and mixture of the air and water. Injection is accomplished at low to moderate air pressures.

Venting wells 28 are located in the vadose zone 12 within a predetermined distance from an injection well 18. The relative distance in both the horizontal and vertical dimensions between injection wells 18 and venting wells 28 is critical to proper operation of the present system. These distances are chosen based on site characteristics. This "well nesting" is discussed in detail in the '919 application. There may be "nests" having a plurality of extraction wells for each injection well, a plurality of injection wells for each extraction well, or pairs of injection/extraction wells (from 200 feet apart to within the same boreholes). A venting well 28 includes a gas-impermeable pipe 30 along the major portion of its length, with a space between the pipe 30 and the well hole. The upper end of venting well 28 contains perforations or openings 32, such as a sparger from a gravel packed, 10–40 slot aperture size well screen or piping with holes in it. The lower portion of venting well 28 comprises fill material 110 packed around pipe 30. Fill material 110 is preferably relatively permeable to air and other gases yet having low-capillary lift properties. Preferably, fill material 110 is silica sand. Such fill material 110 permits air and contaminants to pass up venting well 28 and through screen 32 yet resists up-welling and condensation of contaminated, liquid, ground water, which are typically present in prior art venting wells perforated at the lower end, and prevents clogging of openings 32 and fouling of vacuum pumps, where employed. Preferably, the lower portion of venting well 28 additionally comprises a condensate drain 33 which releases condensate back into the vadose zone rather than accumulating condensate at the bottom of venting well 28.

Venting wells 28 may be, but need not be, connected to a fan or vacuum pump (not shown) via manifold 104. If employed, the fan or vacuum pump is preferably of a capacity of 10 to 300 cfm. Injection of air via injection wells 18 volatilizes contaminants and forces these contaminants and contaminant-breakdown byproducts up and into venting wells 28. If employed, the fan or vacuum pump assists in drawing the volatile contaminants and byproducts into venting wells 28 in a controlled manner.

In an alternative embodiment of the invention, air injection wells 18, in the absence of extraction wells, are utilized to volatilize contaminants and provoke biodegradation of contaminants. The volatilized contaminants rise to the surface and are vented to the atmosphere. Obviously, this embodiment should not be utilized when control of the vented gases is desired or required.

Figure 2:
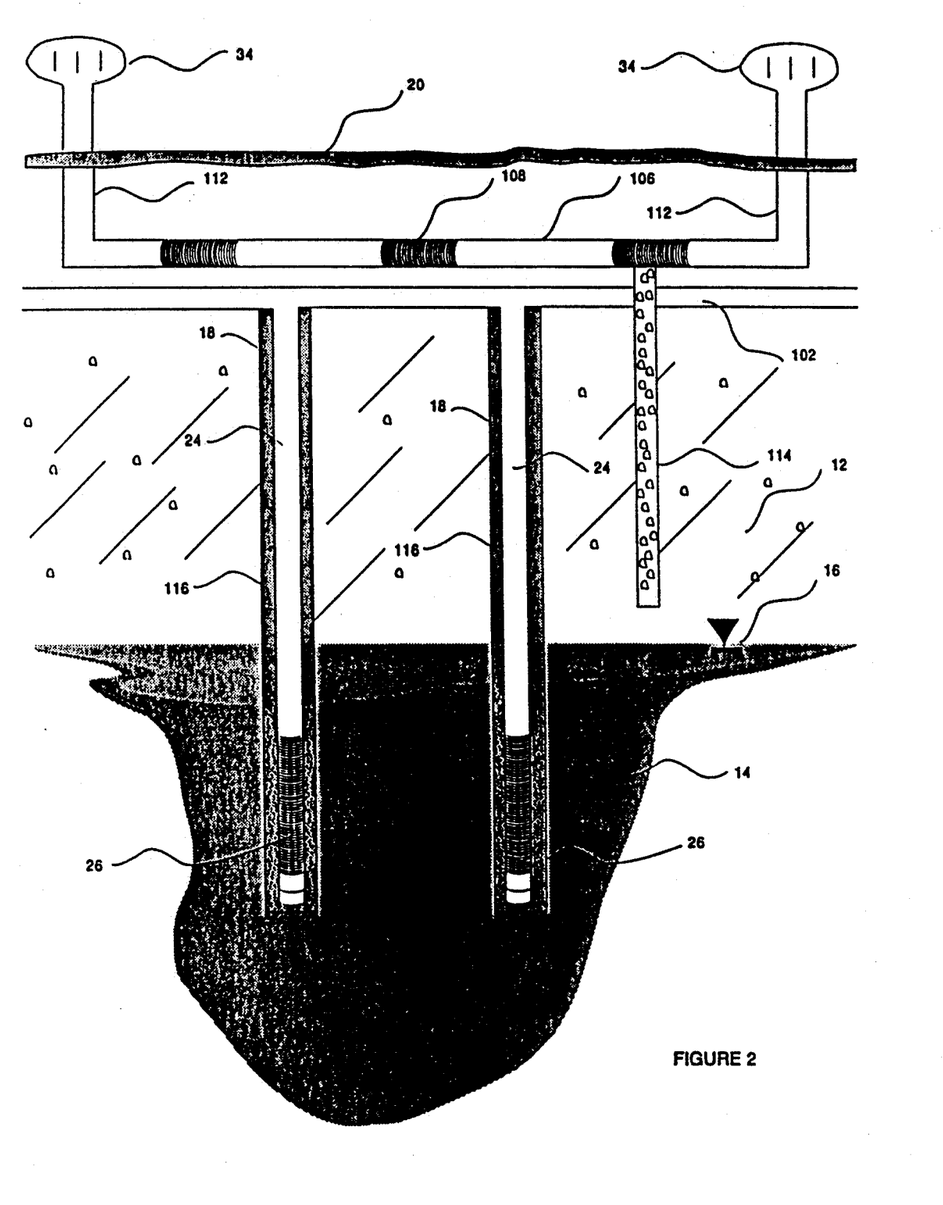
FIG. 2 is a schematic illustration in cross-section of a subterranean soil formation having a water table, and wherein an alternative method and system of the present invention are being applied.

FIG. 2 illustrates another alternative embodiment of the method and system of the present invention. In this embodiment, injection wells 18 are constructed as in the preferred embodiment illustrated in FIG. 1. Venting laterals 106, comprising gas-impermeable piping having screens or perforations 108 therein, permit ingress of air, contaminants, and biodegradation byproducts. Venting laterals 106 are beneath surface 20 far enough to prevent migration of surface water into laterals 106. Such location eliminates the fouling of venting wells near the water table by subsurface water, and fouling of venting pumps by condensate, associated with previously existing vacuum extraction and venting systems. Venting laterals 106 additionally comprise conduits 112 leading to surface 20. Optionally, venting fans or vacuum pumps 34 are fluidly connected to one or more conduits 112.

As illustrated in FIG. 2, the alternative method and system of the invention may optionally comprise venting chimneys 114 beneath one or more lateral screens 108. Venting chimneys 114, preferably shafts filled with silica sand (or other gas-permeable, low capillary-lift material), permit upward migration of air, contaminants, and by-products, but discourage upward migration of liquid water. Venting chimneys 114 may additionally comprise (not shown) PVC piping having one or more screens or openings therein; the vertical piping may connect to venting lateral 106 or may connect to a separate venting manifold. As is readily observable by those skilled in the art, venting laterals 106 may be employed without venting chimneys 114 or with any combination of silica sand shafts, vertical PVC piping, or other venting means known in the art, depending on site stratigraphy and other factors. For example, a silica sand venting chimney may have vertical piping extending only through an upper portion of the chimney.

Figure 3:
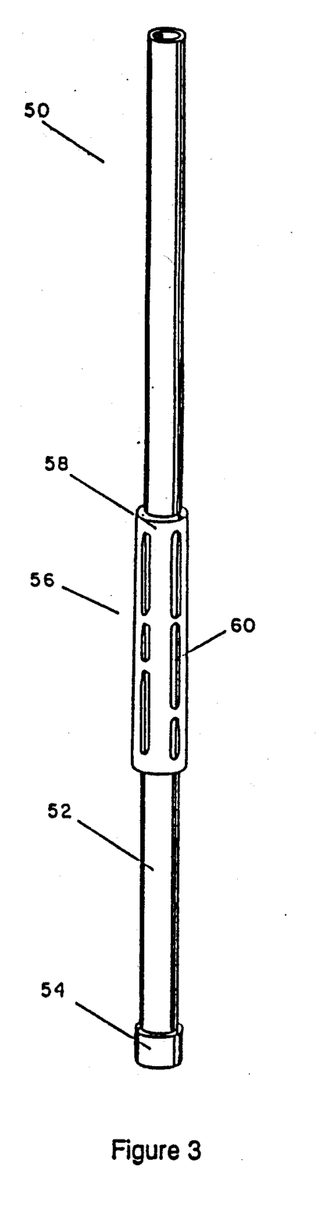
FIG. 3 is an exterior view of the free-product extraction apparatus of the invention.
Figure 4:
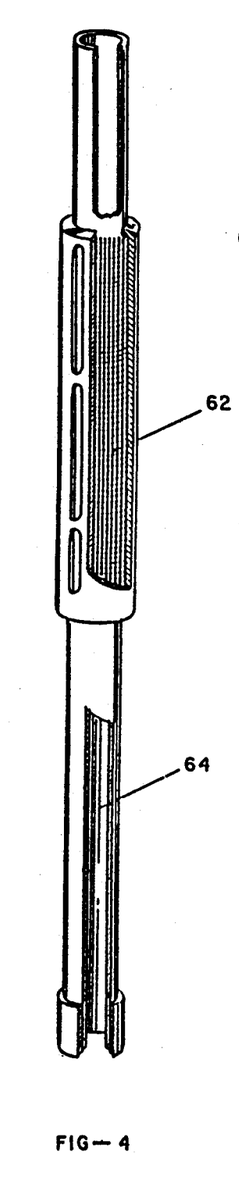
FIG. 4 is an interior exposed view of the free-product extraction apparatus.
Figure 5:
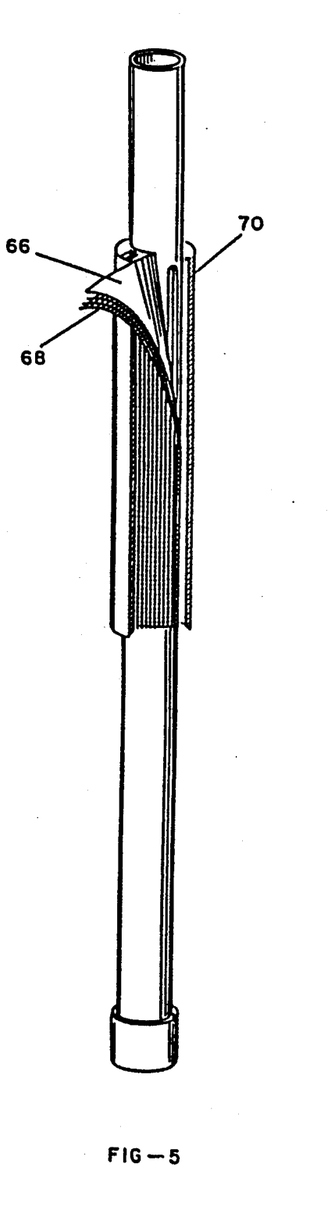
FIG. 5 is a further interior exposed view of the free-product extraction apparatus.

The gas-impermeable piping 24 and 30 of the injection and venting wells 18 and 28 and of venting laterals 106 may consist of metal or plastic piping, such as one- to two-inch PVC piping. The annulus of all wells (opening between borehole and pipe) is preferably sealed above the screens (e.g., with a bentonite/cement mixture 116) to prevent suction loss and migration of surface water and free contaminants to the subsurface.

Where a liquid contaminant is known to be present as freeproduct within the ground water 14 (or in the soil above the water table), the following method of separation and extraction is employed. FIG. 3 illustrates the preferred method and apparatus for free-product extraction. A free-product extractor 50 is inserted in an extended venting well 28. The extractor 50 comprises a hollow reservoir 52, end cap 54, and an entry cartridge 56. The entry cartridge 56 comprises a protector 58, outer ports 60, and a filtration screen 62. The filtration screen 62 comprises an outer layer 68 and a hydrophobic filter 66. The entry cartridge 56 covers inner ports 70 permitting passage of fluid contaminants to the hollow interior 64 of the reservoir 52. Free product extractor may be used in situ or in various configurations for surface, laboratory, or industrial use.

Non-dissolved liquid contaminant is separated from ground water 14 (or extracted from soil above the water table) by placing entry cartridge 56 in contact with the contaminant/water mixture (or contaminant/soil mixture) found at the bottom of an extended venting well 28. Alternatively, free-product extraction apparatuses 50 may be placed in bore holes of insertion wells 18, or a combination of insertion wells 18 and venting wells 28, or in entirely separate bore holes. The contaminant/water mixture contacts filtration screen 62 through outer ports 60. Subsurface fluid pressures force liquid contaminant through filtration screen 62 into the interior 64. However, water does not enter interior 64 because it cannot pass through hydrophobic filter 66. Subsurface fluid pressures, and not pumping pressures, force fluid contaminant to gradually fill reservoir 52. The reservoir 52 then is pumped and allowed to refill before further pumping. This under-pumping allows the well to retain maximum efficiency.

According to the invention, the following method is employed to extract, analyze, ferment, and reintroduce microorganisms useful in biodegradation of contaminants. Water or soil samples (or both) are taken from several contaminated zones (and, at times, from non-contaminated zones) within the site, because microbes are not uniformly distributed within a site. The samples are examined to determine the genera of microbes present and their concentrations. Microbes known or demonstrated to be useful in biodegrading the contaminant at the site are isolated and fermented to increase population. The site is then inoculated with the heightened population either through the point of contamination or through one or more injection wells 18 or venting wells 28 (or separate wells).

As the concentration of contaminant decreases, the concentration of contaminant degrading microbes must also decrease. If the rate of the microbial decrease is sufficient that it becomes apparent that the site will not reach statutory or desired limits in a rapid fashion, the preferred embodiment employs the following growth-stimulation method. Using this approach, food supplies (generally organic) or nutrients (generally inorganic) are inserted into the site using the same physical distribution of wells as is used for other aspects of this integrated remediation system. This results in a very cost effective enhancement of the rate of bioremediation without requiring any additional physical apparatus. This process takes place primarily in injection wells 18. However, if the vadose zone 12 is exceptionally dry, humidity enhancement and nutrient/food enhancement take place in the venting wells 28.

The outlets of venting wells 28 or venting laterals 106 may be connected to suitable stacks, vents, scrubbers, condensers, chemical filters and/or scavengers (not shown), to collect, dilute or vent contaminants extracted from the soil and ground water. The preferred embodiment of the biotreater uses flow rates in the air injection system which allow maximum bioremediation of the vapors so that air quality standards are not exceeded by the fluids vented by the remediation unit. However, some site conditions are such that one must vent at a heavier or faster rate, thus potentially exceeding air quality standards. Normally the present invention is operated in such a fashion that post-treatment of extracted gases is not necessary. However, the present invention provides a post-treatment method which, if necessary on the site, is very cost-effective and requires no electrical power. An example of other useful filters are activated carbon filters, prior art biotreaters, treatment by incineration, catalytic oxidation, or ultraviolet rays. These latter techniques are considerably more expensive than is the present invention.

Figure 6:
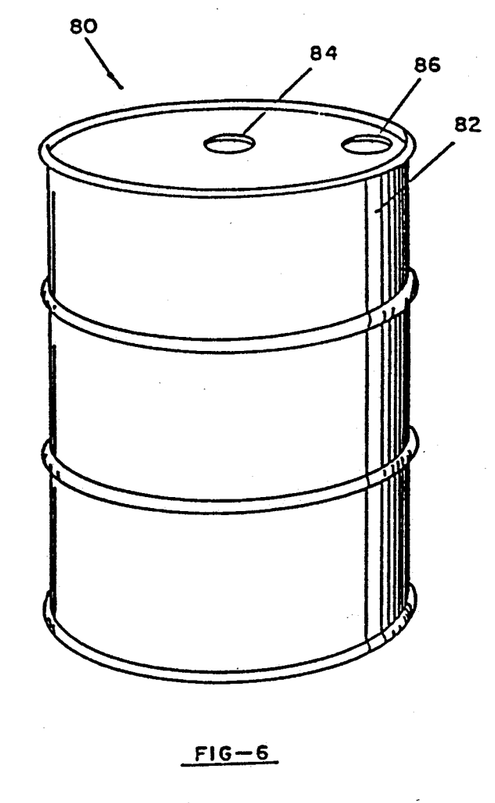
FIG. 6 is an exterior view of the biotreater apparatus of the invention.
Figure 7:
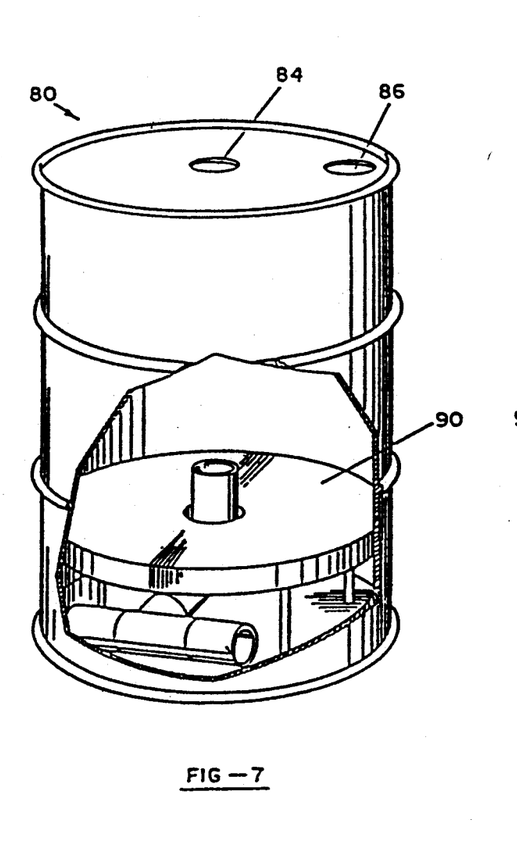
FIG. 7 is an interior exposed view of the biotreater apparatus.
Figure 8:
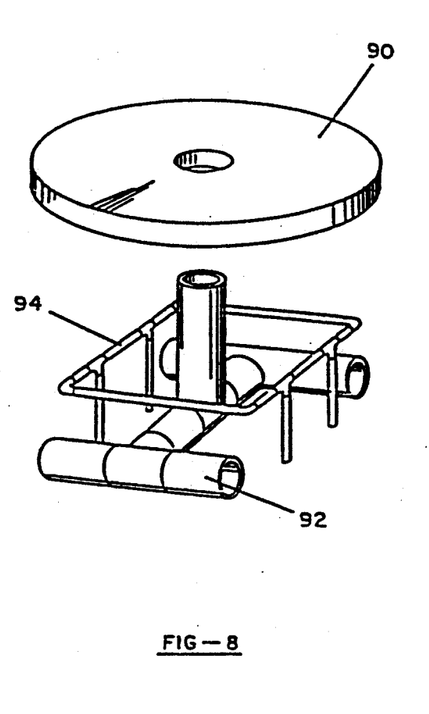
FIG. 8 is an illustration of interbasal components of the biotreater apparatus.

The preferred biotreater 80 illustrated in FIGS. 6 through 8 is employed at the outlets of venting wells 28 or venting laterals 106. An air conductive pathway (not shown) is established between an outlet and diffuser 92, passing through inlet 84 into container 82, preferably a 55-gallon drum. The biotreater 80 is filled (preferably partially filled) with water impregnated with microbes determined to have a degrading effect on the contaminant being extracted. When the vacuum pump 34 is in operation, contaminated air passes into biotreater 80, bubbles up through the micro-impregnated water from diffuser 92, past baffle 90 supported by stand 94, and out through biotreater outlet 86.

A plurality of biotreaters 80 may be connected in series to more efficiently decontaminate the air extracted by venting wells 28 or venting laterals 106. Biotreaters may be added or deleted from the series as contaminant concentration from the vacuum pump 34 increases or decreases. Preferably, the microorganisms placed within the biotreaters are fermented from subsurface samples, and hence are identical to the microorganisms reintroduced to the subsurface at heightened concentration.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all applications, patents, and publications cited above, and of the corresponding application are hereby incorporated by reference.

What is claimed is:

1. A method of in situ removal of contaminants from soil or from ground water, the method comprising the steps of establishing in situ at least one venting well comprising gas-permeable openings at an upper portion thereof and a condensate drain at a lower end thereof and removing volatile contaminants in the ground water or soil through the venting well.

2. The method of claim 1 further comprising the step of applying a vacuum to the venting well.

3. The method of claim 1 further comprising the steps of establishing in situ at least one injection well and injecting oxygen-containing fluid into the injection well.

4. The method of claim 3 wherein the establishing steps comprise establishing the venting well and the injection well as a well nest.

5. The method of claim 1 additionally comprising the step of providing microorganisms into the subsurface.

6. The method of claim 5 additionally comprising the step of providing nutrients/food to the microorganisms in the subsurface.

7. The method of claim 1 additionally comprising the steps of:
   a) sampling soil or water;
   b) isolating at least one microorganism useful in biodegrading the contaminants;
   c) fermenting the isolated microorganisms to increase their population; and
   d) inserting the fermented microorganisms into the subsurface.

8. The method of claim 1 additionally comprising the steps of:
   a) providing an elongated tube reservoir capped at one end;
   b) providing entry ports in the elongated tube reservoir;
   c) surrounding the entry ports with filtration means; and
   d) collecting contaminants in the elongated tube reservoir by passage thereof through the filtration means.

9. The method of claim 1 additionally comprising the steps of:
   a) impregnating water with microorganisms useful in biodegradation of the contaminant;
   b) confining the impregnated water to one or more containers; and
   c) bubbling contaminants from the venting well through the impregnated water within the containers.

10. The method of claim 1 wherein, in the establishing step, the venting well additionally comprises gas-permeable but low capillary-lift fill material below the gas-permeable openings in the venting well.

11. A method of in situ removal of contaminants from soil or ground water, the method comprising the steps of:
   a) establishing in situ venting lateral means comprising gas-permeable openings therein;
   b) establishing in situ a plurality of injection wells;
   c) injecting oxygen-containing fluid into the injection wells; and
   d) placing vertical venting means comprising sand beneath the venting lateral means;
   whereby volatile contaminants in the ground water or soil are removed through the venting lateral means.

12. The method of claim 11 further comprising the step of applying a vacuum to the venting lateral means.

13. The method of claim 11 wherein the establishing steps comprise establishing the venting lateral means and the injection well as a well nest.

14. The method of claim 11 additionally comprising the step of providing microorganisms into the subsurface.

15. The method of claim 14 additionally comprising the step of providing nutrients/food to the microorganisms in the subsurface.

16. The method of claim 11 additionally comprising the steps of:
   e) sampling soil or water;
   f) isolating at least one microorganism useful in biodegrading the contaminants;
   g) fermenting the isolated microorganisms to increase their population; and
   h) inserting the fermented microorganisms into the subsurface.

17. The method of claim 11 additionally comprising the steps of:
   e) providing an elongated tube reservoir capped at one end;
   f) providing entry ports in the elongated tube reservoir;
   g) surrounding the entry ports with filtration means; and
   h) collecting contaminants in the elongated tube reservoir by passage thereof through the filtration means.

18. The method of claim 11 additionally comprising the steps of:
   e) impregnating water with microorganisms useful in biodegradation of the contaminant;
   f) confining the impregnated water to one or more containers; and
   g) bubbling contaminants from the venting lateral means through the impregnated water within the containers.

19. The method of claim 11 wherein the placing step comprises placing vertical venting means comprising a gas-permeable chimney beneath the venting lateral means.

20. The method of claim 11 wherein the placing step comprises placing vertical venting means beneath one or more of the gas-permeable openings of the venting lateral means.

21. The method of claim 11 wherein the placing step comprises the step of placing vertical venting means comprising a venting well, having gas-permeable openings therein, beneath the venting lateral means, the venting well being fluidly connected to the venting lateral means.

22. A method of in situ removal of contaminants from soil or ground water, the method comprising the steps of:
   a) establishing in situ venting lateral means comprising gas-permeable openings therein;
   b) placing vertical venting means comprising sand beneath the venting lateral means; and
   c) removing volatile contaminants in the ground water or soil through the venting lateral means.

23. The method of claim 22 further comprising the step of applying a vacuum to the venting lateral means.

24. The method of claim 22 further comprising the steps of establishing in situ at least one injection well and injecting oxygen-containing fluid into the injection well.

25. The method of claim 24 wherein the establishing steps comprise establishing the venting lateral means and the injection well as a well nest.

26. The method of claim 22 additionally comprising the step of providing microorganisms into the subsurface.

27. The method of claim 26 additionally comprising the step of providing nutrients/food to the microorganisms in the subsurface.

28. The method of claim 22 additionally comprising the steps of:
   d) sampling soil or water;
   e) isolating at least one microorganism useful in biodegrading the contaminants;
   f) fermenting the isolated microorganisms to increase their population; and
   g) inserting the fermented microorganisms into the subsurface.

29. The method of claim 22 additionally comprising the steps of:
   d) providing an elongated tube reservoir capped at one end;
   e) providing entry ports in the elongated tube reservoir;
   f) surrounding the entry ports with filtration means; and
   g) collecting contaminants in the elongated tube reservoir by passage thereof through the filtration means.

30. The method of claim 22 additionally comprising the steps of:
   d) impregnating water with microorganisms useful in biodegradation of the contaminant;
   e) confining the impregnated water to one or more containers; and
   f) bubbling contaminants from the venting lateral means through the impregnated water within the containers.

31. The method of claim 22 wherein the placing step comprises placing a gas-permeable chimney beneath the venting lateral means.

32. The method of claim 22 wherein the placing step comprises placing the vertical venting means beneath the gas-permeable opening of the venting lateral means.

33. The method of claim 22 wherein the placing step comprises the step of placing vertical venting means comprising a venting well, having gas-permeable openings therein, beneath the venting lateral means, the venting well being fluidly connected to the venting lateral means.

34. A method of in situ removal of contaminants from soil or from ground water, the method comprising the steps of:
   a) establishing in situ at least one injection well into the ground water;
   b) injecting oxygen-containing fluid into the injection well to volatilize and biodegrade the contaminants in the ground water and soil;
   c) permitting upward migration of the volatilized and biodegraded contaminants without one or more venting conduits; and
   d) increasing the rate of biodegradation by substantially maximizing available oxygen to microorganisms present in the soil or ground water.

35. An apparatus for in situ removal of contaminants from soil or from ground water, said apparatus comprising at least one venting well, said venting well comprising gas-permeable openings at an upper portion thereof and a condensate drain at a lower end thereof, and means for removing volatile contaminants in the ground water or soil through said venting well.

36. The apparatus of claim 35 further comprising means for applying a vacuum to said venting well.

37. The apparatus of claim 35 further comprising at least one injection well and means for injecting oxygen-containing fluid into said injection well.

38. The apparatus of claim 37 wherein said venting well and said injection well comprise a well nest.

39. The apparatus of claim 35 additionally comprising means for providing microorganisms into the subsurface.

40. The apparatus of claim 39 additionally comprising means for providing nutrients/food to the microorganisms in the subsurface.

41. The apparatus of claim 35 additionally comprising:
   means for sampling soil or water;
   means for isolating at least one microorganism useful in biodegrading the contaminants;
   means for fermenting the isolated microorganisms to increase their population; and
   means for inserting the fermented microorganisms into the subsurface.

42. The apparatus of claim 35 additionally comprising:
   an elongated tube reservoir capped at one end and comprising entry ports therein;

filtration means surrounding said entry ports; and means for collecting contaminants which enter said elongated tube reservoir by passage through said filtration means.

43. The apparatus of claim 35 additionally comprising:

means for impregnating water with microorganisms useful in biodegradation of the contaminant;

one or more containers confining the impregnated water; and means for bubbling contaminants from said venting well through the impregnated water within said containers.

44. The apparatus of claim 35 wherein said venting well additionally comprises gas-permeable but low capillary-lift fill material below said gas-permeable openings in said venting well.

45. An apparatus for in situ removal of contaminants from soil or ground water, said apparatus comprising:

venting lateral means having gas-permeable openings therein;

a plurality of injection wells;

means for injecting oxygen-containing fluid into said injection wells; and vertical venting means comprising sand beneath said venting lateral means;

whereby volatile contaminants in said ground water or soil are removed through said venting lateral means.

46. The apparatus of claim 45 further comprising means for applying a vacuum to said venting lateral means.

47. The apparatus of claim 45 wherein said venting lateral means and said injection well comprise a well nest.

48. The apparatus of claim 45 additionally comprising means for providing microorganisms into the subsurface.

49. The apparatus of claim 48 additionally comprising means for providing nutrients/food to the microorganisms in the subsurface.

50. The apparatus of claim 45 additionally comprising:

means for sampling soil or water;

means for isolating at least one microorganism useful in biodegrading the contaminants;

means for fermenting the isolated microorganisms to increase their population; and means for inserting the fermented microorganisms into the subsurface.

51. The apparatus of claim 45 additionally comprising:

an elongated tube reservoir capped at one end and comprising entry ports therein;

filtration means surrounding said entry ports; and means for collecting contaminants which enter said elongated tube reservoir by passage through said filtration means.

52. The apparatus of claim 45 additionally comprising:

means for impregnating water with microorganisms useful in biodegradation of the contaminant;

one or more containers confining the impregnated water; and means for bubbling contaminants from said venting well through the impregnated water within said containers.

53. The apparatus of claim 45 wherein said vertical venting means comprises a gas-permeable chimney.

54. The apparatus of claim 45 wherein said vertical venting means is beneath one or more of said gas-permeable openings of said venting lateral.

55. The apparatus of claim 45 wherein said vertical venting means comprises a venting well having gas-permeable openings therein, said venting well being fluidly connected to said venting lateral.

56. An apparatus for in situ removal of contaminants from soil or ground water, said apparatus comprising:

venting lateral means comprising gas-permeable openings therein;

vertical venting means comprising sand beneath said venting lateral means; and means for removing volatile contaminants in the ground water or soil through said venting lateral means.

57. The apparatus of claim 56 further comprising means for applying a vacuum to said venting lateral means.

58. The apparatus of claim 56 further comprising at least one injection well and means for injecting oxygen-containing fluid into said injection well.

59. The apparatus of claim 58 wherein said venting lateral means and said injection well comprise a well nest.

60. The apparatus of claim 56 additionally comprising means for providing microorganisms into the subsurface.

61. The apparatus of claim 60 additionally comprising means for providing nutrients/food to the microorganisms in the subsurface.

62. The apparatus of claim 56 additionally comprising:

means for sampling soil or water;

means for isolating at least one microorganism useful in biodegrading the contaminants;

means for fermenting the isolated microorganisms to increase their population; and means for inserting the fermented microorganisms into the subsurface.

63. The apparatus of claim 56 additionally comprising:

an elongated tube reservoir capped at one end and comprising entry ports therein;

filtration means surrounding said entry ports; and means for collecting contaminants which enter said elongated tube reservoir by passage through said filtration means.

64. The apparatus of claim 56 additionally comprising:

means for impregnating water with microorganisms useful in biodegradation of the contaminant;

one or more containers confining the impregnated water; and means for bubbling contaminants from said venting well through the impregnated water within said containers.

65. The apparatus of claim 56 wherein said vertical venting means comprises a gas-permeable chimney beneath said venting lateral means.

66. The apparatus of claim 56 wherein said vertical venting means is beneath said gas-permeable opening of said venting lateral.

67. The apparatus of claim 56 wherein said vertical venting means comprises a venting well having gas-permeable openings therein, said venting well being fluidly connected to said venting lateral.

68. An apparatus for in situ removal of contaminants from soil or from ground water, said apparatus comprising:
- at least one injection well extending into the ground water;
- means for injecting oxygen-containing fluid into said injection well to volatilize and biodegrade the contaminants in the ground water and soil;
- means for permitting upward migration of said volatilized and biodegraded contaminants without one or more venting conduits; and
- wherein said injecting means increases the rate of biodegradation by substantially maximizing available oxygen to microorganisms present in the soil or ground water.

69. A method of in situ gas sparging and bioremediation for removal of contaminants from soil or from ground water present in the soil in the form of a ground water aquifer, there being a vadose zone existing down to a water table defining the upper boundary of the ground water aquifer, the method comprising the steps of:
- a) establishing one or more injection wells extending through the vadose zone to a depth below the water table;
- b) establishing one or more extraction wells in the vadose zone extending to a depth above the water table;
- c) injecting oxygen-containing fluid into one or more injection wells;
- d) stimulating with the oxygen-containing fluid microorganisms present in the soil or the ground water;
- e) increasing the rate of biodegradation of volatile and non-volatile contaminants by introducing in situ oxygen in the oxygen-containing fluid via the one or more injection wells; and
- f) extracting, via the one or more extraction wells, an effluent containing volatile contaminants and biodegradation by-products of both volatile and non-volatile contaminants from the soil or the ground water.

70. The method of claim 69 wherein the step of establishing one or more extraction wells comprises the step of establishing one or more extraction wells comprising gas-permeable openings at an upper portion thereof.

71. The method of claim 69 wherein the step of establishing one or more extraction wells comprises the step of establishing in situ venting lateral means comprising gas-permeable openings therein.

72. The method of claim 71 additionally comprising the step of placing vertical venting means comprising a gas-permeable chimney beneath the venting lateral means.

73. The method of claim 72 wherein the placing step comprises placing the vertical venting means beneath one or more of the gas-permeable openings of the venting lateral means.

74. The method of claim 72 wherein the placing step comprises placing vertical venting means comprising a high permeability, low capillary lift fill material.

75. The method of claim 72 wherein the placing step comprises placing vertical venting means comprising a venting well, comprising gas-permeable openings therein, beneath the venting lateral means, the venting well being fluidly connected to the venting lateral means.

76. The method of claim 69 wherein the microorganism stimulating step comprises continuously stimulating the microorganisms with the oxygen-containing gas.

77. The method of claim 69 wherein the step of increasing the rate of biodegradation comprises substantially maximizing available oxygen introduced in situ via the injection wells.

78. The method of claim 69 wherein the extracting step comprises the step of applying a vacuum to one or more of the extraction wells.

79. The method of claim 78 wherein the step of applying a vacuum comprises applying a vacuum at a negative flow.

80. The method of claim 79 wherein the step of applying a vacuum at a negative flow comprises applying a vacuum at a negative flow which is volumetrically greater than a positive flow of fluid injected into the one or more injection wells.

81. The method of claim 69 wherein the step of establishing one or more extraction wells comprises establishing at least one extraction well comprising a condensate drain.

82. The method of claim 69 additionally comprising the step of providing microorganisms into the soil or the ground water.

83. The method of claim 69 additionally comprising the step of providing nutrients/food to microorganisms in the soil or the ground water.

84. The method of claim 69 additionally comprising the steps of:
- g) sampling soil or water;
- h) isolating at least one microorganism useful in biodegrading the contaminants;
- i) fermenting the isolated microorganisms to increase their population; and
- j) inserting the fermented microorganisms into the soil or the ground water.

85. The method of claim 69 additionally comprising the steps of:
- g) providing an elongated tube reservoir capped at one end;
- h) providing entry ports in the elongated tube reservoir;
- i) surrounding the entry ports with filtration means; and
- j) collecting contaminants in the elongated tube reservoir by passage thereof through the filtration means.

86. The method of claim 69 additionally comprising the steps of:
- g) impregnating water with microorganisms useful in biodegradation of the contaminants;
- h) confining the impregnated water to one or more containers; and
- i) bubbling the effluent through the impregnated water within the containers.

87. The method of claim 69 wherein the step of establishing one or more extraction wells comprises placing gas-permeable but low capillary-lift fill material below gas-permeable openings in one or more of the extraction wells.

88. An apparatus for in situ gas sparging and bioremediation for removal of contaminants from soil and from ground water present in the soil in the form of a ground water aquifer, there being a vadose soil zone existing down to a water table defining the upper boundary of the ground water aquifer, said apparatus comprising:
- one or more injection wells extending through the vadose zone to a depth below the water table;
- one or more extraction wells in the vadose zone extending to a depth above the water table;
- means for injecting oxygen-containing fluid into one or more of the injection wells, stimulating via the oxygen-containing fluid microorganisms present in the soil or the ground water and increasing the rate of biodegradation of volatile and non-volatile contaminants; and
- means for extracting, via the one or more extraction wells, an effluent containing volatile contaminants and biodegradation by-products of both volatile and non-volatile contaminants from the soil or the ground water.

89. The apparatus of claim 88 wherein said one or more extraction wells comprises gas-permeable openings at an upper portion thereof.

90. The apparatus of claim 88 wherein said one or more extraction wells comprises in situ venting lateral means comprising gas-permeable openings therein.

91. The apparatus of claim 90 additionally comprising vertical venting means comprising a gas-permeable chimney disposed beneath said venting lateral means.

92. The apparatus of claim 91 wherein said vertical venting means is disposed beneath one or more of said gas-permeable openings in said venting lateral means.

93. The apparatus of claim 91 wherein said vertical venting means comprises a high permeability, low capillary lift fill material.

94. The apparatus of claim 91 wherein said vertical venting means comprises venting well means, comprising gas-permeable openings therein, beneath the venting lateral means, said venting well means being fluidly connected to said venting lateral means.

95. The apparatus of claim 89 wherein said injecting means continuously stimulates the microorganisms via the oxygen-containing gas.

96. The apparatus of claim 88 wherein said injecting means substantially maximizes available oxygen to the microorganisms.

97. The apparatus of claim 88 wherein said extracting means comprises means for applying a vacuum to one or more of said extraction wells.

98. The apparatus of claim 87 wherein said means for applying a vacuum comprises means for applying a vacuum at a negative flow.

99. The apparatus of claim 98 wherein said means for applying a vacuum at a negative flow comprises means for applying a vacuum at a negative flow which is volumetrically greater than a positive flow of fluid injected into said one or more injection wells.

100. The apparatus of claim 88 wherein said at least one extraction well comprises a condensate drain.

101. The apparatus of claim 88 additionally comprising means for providing microorganisms into the soil or the ground water.

102. The apparatus of claim 88 additionally comprising means for providing nutrients/food to microorganisms in the soil or the ground water.

103. The apparatus of claim 88 additionally comprising:
- means for sampling soil or water;
- means for isolating at least one microorganism useful in biodegrading the contaminants;
- means for fermenting the isolated microorganisms to increase their population; and
- means for inserting the fermented microorganisms into the soil or the ground water.

104. The apparatus of claim 88 additionally comprising:
- an elongated tube reservoir capped at one end and comprising entry ports therein;
- filtration means surrounding said entry ports; and
- means for collecting contaminants which enter said elongated tube reservoir by passage through said filtration means.

105. The apparatus of claim 88 additionally comprising:
- means for impregnating water with microorganisms useful in biodegradation of the contaminants;
- one or more containers confining the impregnated water; and
- means for bubbling the effluent through the impregnated water within said containers.

106. The apparatus of claim 88 wherein said one or more extraction wells comprise gas-permeable but low capillary-lift fill material below gas-permeable openings in one or more of said extraction wells.

107. A method of in situ removal of contaminants from soil or from ground water, the method comprising the steps of:
a) establishing in situ at least one injection well into the ground water;
b) injecting oxygen-containing fluid into the injection well to volatilize and biodegrade the contaminants in the ground water and soil;
c) permitting upward migration of the volatilized and biodegraded contaminants without one or more venting conduits; and
d) providing microorganisms into the subsurface.

108. The method of claim 107 further comprising the step of providing nutrients/food to the microorganisms in the subsurface.

109. A method of in situ removal of contaminants from soil or from ground water, the method comprising the steps of:
a) establishing in situ at least one injection well into the ground water;
b) injecting oxygen-containing fluid into the injection well to volatilize and biodegrade the contaminants in the ground water and soil;
c) permitting upward migration of the volatilized and biodegraded contaminants without one or more venting conduits;
d) sampling soil or water;
e) isolating at least one microorganism useful in biodegrading the contaminants;
f) fermenting the isolated microorganisms to increase their population; and
g) inserting the fermented microorganisms into the subsurface.

110. A method of in situ removal of contaminants from soil or from ground water, the method comprising the steps of:
a) establishing in situ at least one injection well into the ground water;
b) injecting oxygen-containing fluid into the injection well to volatilize and biodegrade the contaminants in the ground water and soil;
c) permitting upward migration of the volatilized and biodegraded contaminants without one or more venting conduits;

d) providing an elongated tube reservoir capped at one end;

e) providing entry ports in the elongated tube reservoir;

f) surrounding the entry ports with filtration means; and g) collecting contaminants in the elongated tube reservoir by passage thereof through the filtration means.

111. An apparatus for in situ removal of contaminants from soil or from ground water, said apparatus comprising:

at least one injection well extending into the ground water;

means for injecting oxygen-containing fluid into said injection well to volatilize and biodegrade the contaminants in the ground water and soil;

means for permitting upward migration of said volatilized and biodegraded contaminants without one or more venting conduits; and means for providing microorganisms into the subsurface.

112. The apparatus of claim 111 further comprising means for providing nutrients/food to the microorganisms in the subsurface.

113. An apparatus for in situ removal of contaminants from soil or from ground water, said apparatus comprising:

at least one injection well extending into the ground water;

means for injecting oxygen-containing fluid into said injection well to volatilize and biodegrade the contaminants in the ground water and soil;

means for permitting upward migration of said volatilized and biodegraded contaminants without one or more venting conduits;

means for sampling soil or water;

means for isolating at least one microorganism useful in biodegrading the contaminants;

means for fermenting the isolated microorganisms to increase their population; and means for inserting the fermented microorganisms into the subsurface.

114. An apparatus for in situ removal of contaminants from soil or from ground water, said apparatus comprising:

at least one injection well extending into the ground water;

means for injecting oxygen-containing fluid into said injection well to volatilize and biodegrade the contaminants in the ground water and soil;

means for permitting upward migration of said volatilized and biodegraded contaminants without one or more venting conduits;

an elongated tube reservoir capped at one end and comprising entry ports therein;

filtration means surrounding said entry ports; and means for collecting contaminants which enter said elongated tube reservoir by passage through said filtration means.

* * * * *